United States Patent [19]

McPhaul

[11] Patent Number: 4,697,379

[45] Date of Patent: Oct. 6, 1987

[54] FISHING TACKLE BOX WITH FLASHLIGHT AND INTERNAL LIGHTING

[76] Inventor: Charlotte W. McPhaul, P.O. Box 818, McDade, Tex. 78650

[21] Appl. No.: 845,625

[22] Filed: Mar. 28, 1986

[51] Int. Cl.$^4$ ............................................. A01K 97/00
[52] U.S. Cl. ................................. 43/54.1; 362/156; 206/315.11
[58] Field of Search ............................. 43/54.1, 57.1; 206/315.11; 220/20, 21, 22; 362/183, 155, 154, 156; D3/38; 224/920

[56] References Cited

U.S. PATENT DOCUMENTS

| | | |
|---|---|---|
| 702,403 | 6/1902 | Chapma .............................. 362/156 |
| 2,207,017 | 7/1940 | Lemerman ........................ 362/156 |
| 2,290,410 | 7/1942 | Dunn ................................. 362/156 |
| 2,540,470 | 2/1951 | Baugh ................................ 362/155 |
| 2,608,459 | 8/1952 | Malmquist ......................... 312/351 |
| 2,751,489 | 6/1956 | Cole ................................... 240/6.4 |
| 2,765,576 | 10/1956 | Kurek ................................. 43/54.5 |
| 3,047,349 | 7/1962 | Powell . |
| 3,148,811 | 9/1964 | Foltz ..................................... 224/5 |
| 3,197,915 | 8/1965 | Staver ................................. 43/57.5 |
| 3,410,018 | 11/1968 | Woolworth .................... 206/315.11 |
| 3,780,468 | 12/1973 | Maffett ............................ 43/54.5 R |
| 3,938,132 | 2/1976 | Cunningham ..................... 362/154 |
| 4,020,584 | 5/1977 | Michal ................................ 43/57.1 |
| 4,357,648 | 11/1982 | Nelson ............................... 362/183 |

*Primary Examiner*—Gene P. Crosby
*Assistant Examiner*—G. M. Reid
*Attorney, Agent, or Firm*—Arnold, White & Durkee

[57] ABSTRACT

Disclosed is a multipurpose, illuminated fishing tackle box with flashlight capable of lighting the path of a person carrying the tackle box. An electrical switch for controlling the flow of current to the flashlight is mounted sufficiently close to the carrying handle of the tackle box that it may be operated with the same hand employed to carry the box. In one embodiment of the invention the tackle box with flashlight is equipped with interior-illuminating lights, a cork lining, and magnetic strips for separating and storing fishing hooks and lures.

3 Claims, 3 Drawing Figures

U.S. Patent     Oct. 6, 1987     4,697,379
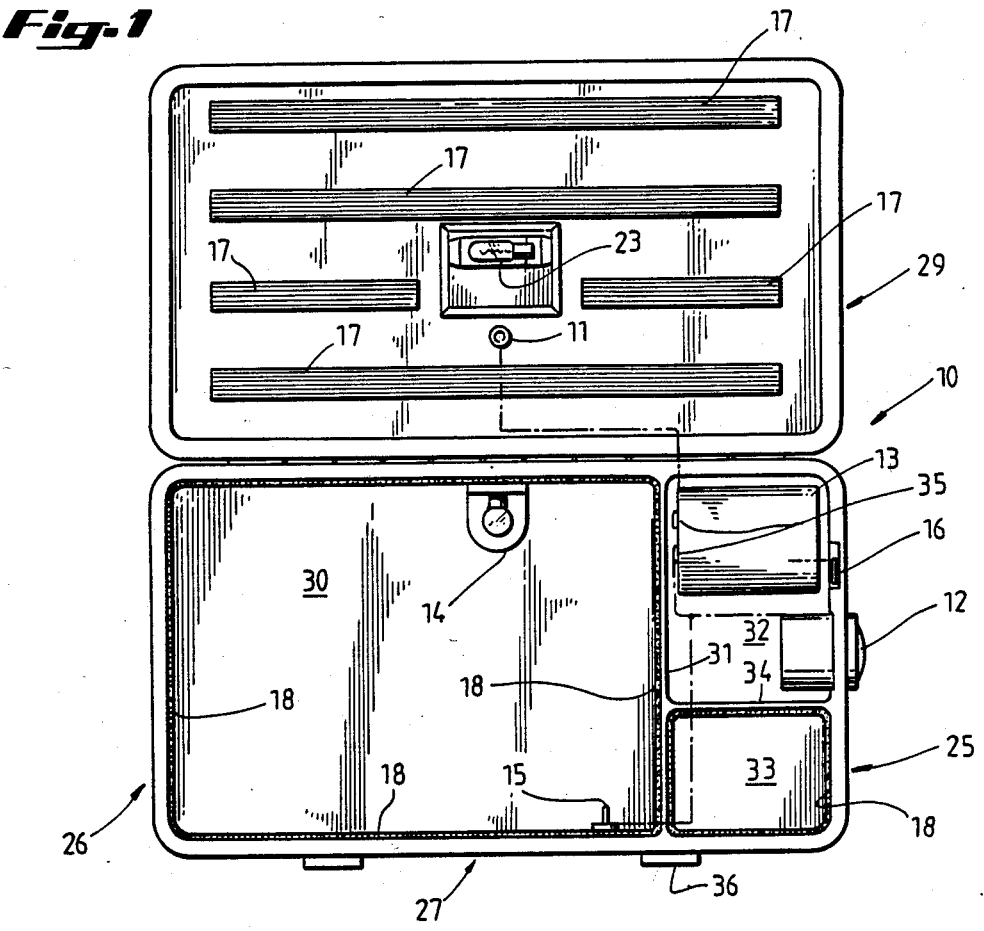
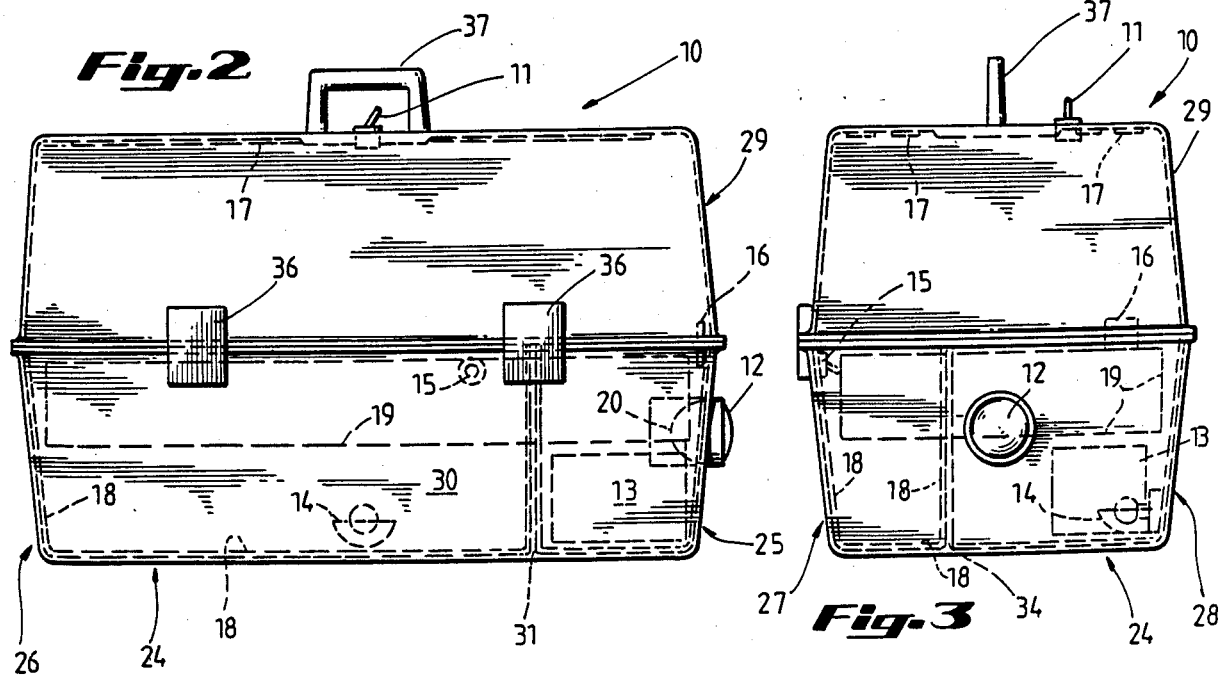

FISHING TACKLE BOX WITH FLASHLIGHT AND INTERNAL LIGHTING

BACKGROUND OF THE INVENTION

1. Field of the Invention.

This invention relates to fishing apparatus. More specifically, it relates to a multipurpose, illuminated tackle box having a flashlight capable of lighting the path of the person carrying the tackle box.

2. The Problem and the Related Art.

Much fishing is done before dawn or after sunset. Under such dark conditions it is virtually necessary that fishermen have available a convenient source of light. Such light is needed not only for convenience in preparing fishing tackle for use, but for safety. Fishermen must frequently walk near the shore of a body of water or walk on a pier or dock and go aboard boats. Such activity can be especially hazardous in the dark; steps, gangplanks, and uneven ground must frequently be navigated while carrying fishing equipment in both hands. In fact, most commonly a fisherman carries a rod and reel in one hand and a tackle box in the other. This obviously does not leave a hand free to carry and manipulate a conventional flashlight.

When a fisherman prepares his or her tackle for use, a similar problem arises. Fishing tackle consists, in large part, of sharply pointed objects, e.g. lures and hooks. It is readily apparent that it would be quite hazardous to fumble in the dark inside a tackle box. Moreover, once the desired item is found, the fisherman frequently needs both hands to attach the lure, hook, sinker, or other item of tackle to the line. Again, this does not leave a hand free to hold a conventional flashlight.

At least two United States patents address the problem of night illumination of tackle boxes. Kurek, U.S. Pat. No. 2,765,576, describes a translucent box which incorporates battery-powered interior illumination. Cole, U.S. Pat. No. 2,751,489, describes a tackle box containing batteries in its handle which power built-in navigation lights and a separate, removable, dirigible light. This latter light is connected to the batteries by an electrical cord and may be clipped to the handle of the box or the gunwale of a boat so as to serve as a running light.

Powell, U.S. Pat. No. 3,047,349, and Malmquist, U.S. Pat. No. 2,608,459, describe the use of a cork lining in a tackle box.

Staver, U.S. Pat. No. 3,197,915, describes the use of magnetic strips within a tackle box to hold and separate small, ferrous items of tackle such as fish hooks. Such strips may be formed from a plastic material loaded with a permanently magnetized powder such as barium iron oxide.

SUMMARY OF THE INVENTION

The invention generally comprises a portable container for fishing tackle and allied equipment in combination with means for illuminating the way of a person carrying the tackle box at his or her side. In a preferred form, the container embodying the invention is corrosion-resistant, and its interior is illuminated so as to permit the user to select and attach the desired item of tackle even at night.

An important feature of the invention lies in means for storage of small items of fishing gear within the tackle box which: (a) keep the items separated from each other thereby permitting their easy selection and avoiding their entanglement; (b) provide a measure of corrosion inhibition; and (c) prevent the sticking of certain plastic items to the walls of the box.

Other objects and advantages of the invention will be apparent in the detailed description of the invention below and the accompanying drawings which form a portion of this disclosure.

DESCRIPTION OF THE DRAWINGS

FIG. 1 is a top plan view of the tackle box shown with the lid in the open position.

FIG. 2 is a side elevation of the tackle box shown with the lid in the closed position.

FIG. 3 is an elevation of that end of the box which contains the external, path-illuminating light. The tackle box is shown with the lid in the closed position.

DETAILED DESCRIPTION OF THE PREFERRED EMBODIMENT

Referring to the drawings, a tackle box 10 is constructed of any suitable material, e.g. plastic, metal, or wood, Inasmuch as tackle boxes are often exposed to the elements and particularly salt water spray, it is preferred that materials used to construct the box be corrosion resistant. Various common plastics are especially suitable in this regard. Top-opening tackle box 10 includes bottom 24; sidewalls 27 and 28; end walls 25 and 26; and hinged lid or cover 29 equipped with closure members 36 which secure the lid to the sidewalls and end walls in a substantially watertight relation. The space enclosed by the substantially rectangular tackle box is approximately equally divided between the body and the cover of the box. A handle 37 for hand-carrying the tackle box is mounted on the upper surface of the cover. The handle may be of the folding type, and the cover may optionally incorporate a recess to stow such a folding handle.

The body of box 10 is divided into a main compartment 30 by transverse partition 31 and two smaller compartments 32 and 33 by longitudinally disposed partition 34.

For the sake of clarity, the folding, translucent trays 19 (shown in FIGS. 2 and 3) are omitted in FIG. 1 which depicts the box in its fully open position. The upper portion of FIG. 1 shows the underside of the lid to which parallel strips 17 of permanently magnetized material are attached. Such strips may be cemented in place or otherwise secured to the lid. Alternatively, if the lid itself is ferromagnetic, the magnetism of the strips themselves may be used to hold them in place. These magnetic strips are useful for holding and separating small items of ferromagnetic tackle, especially fish hooks and flies. The spacing of the strips and the fact that the strips project above the undersurface of the lid permits the hooks, etc. to be easily grasped and additionally helps to keep the delicate feathers, etc. of artificial flies from being crushed or flattened. The present invention demonstrates that the underside of the lid of the tackle box is a particularly convenient place to locate such strips.

The underside of the lid is also fitted with an interior light 23 which is powered by a battery 13. This light, mounted on the undersurface of the cover, illuminates both the items on the magnetic strips and also the tackle within the compartments of the folding, translucent trays (19 in FIGS. 2 and 3) which, when in their open position, are disposed above light 23.

Also shown in the top portion of FIG. 1 is the backside of switch 11 which controls the flow of electric current to exterior light 12. To prevent corrosion and electrolytic action it is preferable to protect this switch and its associated wiring from moisture. Most preferably, the switch would be hermetically sealed. This switch, together with battery connectors 35 and associated wiring, comprises the electrical circuit for connecting the battery 13 to the bulb of exterior light 12.

The bottom portion of FIG. 1 depicts the interior of the tackle box. Three compartments are disclosed. The major compartment, on the left in the figure, is lined with about a quarter-inch layer of cork 18 or other soft, absorbent material such as foam rubber or foamed plastic. The lining provides a soft material around the inner periphery of the box into which the barbed ends of hooks and lures may be embedded to store and separate such items. The cork lining absorbs moisture and prevents the pooling of water within the box thereby inhibiting the corrosion of the contents. Compartment 33 is similarly lined and is especially suitable for the storage of plastic worms. The lining of this compartment prevents such worms from sticking to the sides of the box (particularly if the box is constructed of plastic) and it provides a measure of thermal insulation, which is also important in preventing sticking.

The third compartment, the electrical compartment, is defined by boundary 31. It accommodates a storage battery 13 and contains battery connectors 35 and exterior light 12. This compartment is preferably watertight to isolate it from the tackle storage compartments of the box and is preferably fitted with a separate, substantially watertight lid to protect a battery 13, light 12, and associated wiring from the elements. Additionally, this compartment serves to protect the items of tackle stored in the box should a battery contained therein 13 develop a leak.

Also disclosed in the bottom portion of FIG. 1 is interior light 14, mounted within the body of the box, which illuminates both the storage compartment and the translucent trays (19 in FIGS. 2 and 3) when they are in their closed or unextended position. Interior lights 23 and 14 are wired in parallel with each other and battery connectors 35 and in series with switches 15 and 16. Switch 16 is preferably a normally-closed micro switch which is actuated by the lid of the tackle box. Switch 15 is a manually operated slide switch with "on" and "off" positions which may be selected by the user. By wiring switches 16 and 15 in series with each other and with interior lights 23 and 14 the inadvertent burning of interior lights 23 and 14 is prevented when the tackle box is closed. Moreover, if interior illumination is not desired, such as during daylight operations, switch 15 may be selected to the "off" position; in the "on" position interior lights 23 and 14 automatically illuminate when lid 29 is raised to the open position. Battery power is thus conserved.

FIG. 2 discloses the side elevation of the invention. The folding, translucent trays 19, mounted within the upper portion of the body of the box, are shown in their refolded or unextended position. When in the extended position, these trays substantially overhang the open cover. Exterior light 12, which serves as a flashlight, is shown with a preferred parabolic reflector 20. The location of switch 11 is especially important. It is most preferable that hand-operable switch 11 be mounted on the lid of the box sufficiently close to the carrying handle of the tackle box that it can be actuated with the thumb of the hand used for carrying the box while the box is being carried. Thus, if switch 11 is properly located, one carrying the tackle box can turn exterior light 12 on or off as desired without releasing one's grip on the handle of the tackle box. Alternative locations of switch 11 are the end of carrying handle nearest exterior light 12 and the underside of the carrying handle. A trigger-type switch would be especially convenient if switch 11 were located on the underside of the carrying handle.

FIG. 3 discloses the end elevation of the invention, more specifically, that end of the tackle box containing exterior light 12. Exterior light 12 is permanently mounted in the end wall of the tackle box extending into the electrical compartment and is preferably aimed such that the light it produces illuminates the way of a person carrying the box at his or her side. Thus, most preferably, the beam of light will not be parallel with the long axis of the tackle box, but rather aimed slightly down from that line. Exterior light 12 may comprise either a separate lens and replaceable bulb assembly, or it may be a sealed-beam type of lamp. For maximum intensity, exterior light 12 may comprise a tungsten-halogen bulb, reflector, and separate lens. The lens/bulb/reflector assembly is preferably substantially watertight to inhibit corrosion and electrical shorting.

Battery 13 may be a single lantern battery or it may comprise a plurality of dry cells. Alternatively, battery 13 may be a rechargeable type of battery such as a nickel-cadmium battery or a lead-acid battery. Optionally, the tackle box could be equipped with a charging circuit to serve such a rechargeable battery. Such a circuit could be designed to operate on household current and/or a vehicle's electrical system. Connection could be made to a vehicle by means of a male-type plug which can be inserted into the cigarette lighter receptacle such as is commonly found on a car, truck, or boat.

I claim:

1. A fishing tackle box with flashlight comprising:
    (a) a box including side walls, bottom, and an opening lid defining a compartment suitable for the storage and transportation of items of fishing tackle;
    (b) a handle attached to the box for hand-carrying the box;
    (c) an electric lamp mounted within the box in such a manner that light produced by the lamp shines out of the box in a direction followed by a person carrying the box at his or her side while holding the box by the handle;
    (d) a battery compartment within the box equipped with battery connectors for a storage battery for supplying electric current to the lamp;
    (e) an electrical circuit, including a switch for controlling the flow of electric current from the battery to the lamp, the switch being mounted in a manner which enables its actuation by the same hand used for carrying the box by the handle without releasing one's grip on the handle;
    (f) folding, translucent trays mounted within the upper portion of the body which, when in the retracted position are partially within the confines of the body of the tackle box and the lower portion of the space defined by the cover when it is in the closed position and, when in the extended position, substantially overhang the open cover; and,
    (g) interior lights,
        one interior light being mounted within the body of the box so as to illuminate the interior of the largest compartment of the body and the translucent folding trays when they are in the unextended position and, another interior light being mounted on the undersurface of the cover so as to illuminate items of tackle stored in the cover and the folding, translucent trays when they are in the extended position, the interior lights being connected in parallel with each other and the battery connectors.

2. A fishing tackle box with flashlight as recited in claim 1 which further comprises:

two interior-light switches, one being a manually operated switch located within the body of the box, the other being a normally-closed micro switch mounted so as to be actuated by the cover of the box as it is opened and closed, the switches being in series with each other and the interior lights.

3. An illuminated tackle box with flashlight comprising:

(a) a substantially rectangular body, (b) a cover hinged on the body equipped with a closure member to secure the cover to the body when the cover is in the closed position, (c) a carrying handle for hand-carrying the tackle box mounted on the upper surface of the cover, the space enclosed by the cover being approximately equal in volume to that enclosed by the body, (d) folding translucent trays mounted within the upper portion of the body which, when in the retracted position are partially within the confines of the body of the tackle box and the lower portion of the space defined by the cover when it is in the closed position and, when in the extended position, substantially overhang the open cover, (e) the body of the box having three compartments, the largest of which is lined on its bottom and side surfaces with an approximately quarter-inch layer of a soft, resilient, absorbent material such as cork, a smaller compartment lined in the same fashion as the largest compartment, and a third compartment, the electrical compartment, which contains battery connectors and space for a storage battery, and is equipped with a substantially watertight lid, (f) an exterior light projecting through the side of the box comprising a parabolic reflector, a bulb, and a lens, and associated electrical wiring as means for supplying current from a battery to the light, the electrical compartment being substantially watertight so as to protect the electrical components contained therein from the elements and to protect the contents of the other compartments of the tackle box from contact with corrosive material should the battery develop a leak, (g) a switch in circuit with the electrical wiring for controlling the flow of current from the battery to the exterior light, the switch being mounted on the cover of the box sufficiently near the carrying handle that it may be actuated with the thumb of the hand grasping the carrying handle without releasing one's grip on the handle, (h) interior lights, one interior light being mounted within the body of the box so as to illuminate the interior of the largest compartment of the body and the translucent plastic trays when they are in the unextended position and another interior light being mounted on the undersurface of the cover so as to illuminate items of tackle stored in the cover and the folding, translucent trays when they are in the extended position, the interior lights being connected in parallel with each other and the battery connectors, (i) two interior-light switches, one being a manually operated switch located within the body of the box and the other being a normally-closed microswitch mounted so as to be actuated by the cover of the box as it is opened and closed, the switches being in series with the interior lights, and (j) strips of permanently magnetic material mounted on the undersurface of the cover of the box for use in storing and separating small items of ferromagnetic tackle such as hooks and artifical flies.

* * * * *